(12) United States Patent
Kilian

(10) Patent No.: US 11,032,066 B2
(45) Date of Patent: Jun. 8, 2021

(54) METHOD FOR TAMPER-PROOF STORAGE OF DATA OF A FIELD DEVICE

(71) Applicant: Endress+Hauser SE+Co. KG, Maulburg (DE)

(72) Inventor: Markus Kilian, Merzhausen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 251 days.

(21) Appl. No.: 16/337,699

(22) PCT Filed: Aug. 28, 2017

(86) PCT No.: PCT/EP2017/071543
§ 371 (c)(1),
(2) Date: Mar. 28, 2019

(87) PCT Pub. No.: WO2018/059855
PCT Pub. Date: Apr. 5, 2018

(65) Prior Publication Data
US 2020/0036520 A1 Jan. 30, 2020

(30) Foreign Application Priority Data
Sep. 30, 2016 (DE) .................. 10 2016 118 614.7

(51) Int. Cl.
*H04L 9/08* (2006.01)
*H04L 9/06* (2006.01)
(Continued)

(52) U.S. Cl.
CPC .......... *H04L 9/0816* (2013.01); *H04L 9/0643* (2013.01); *H04L 9/30* (2013.01);
(Continued)

(58) Field of Classification Search
CPC ....... H04L 9/0816; H04L 9/0643; H04L 9/30; H04L 67/10; H04L 67/42; H04L 2209/38
See application file for complete search history.

(56) References Cited

U.S. PATENT DOCUMENTS

| 7,930,516 B1* | 4/2011 | Jin | ................. G06F 16/2255 711/216 |
| 2012/0078864 A1* | 3/2012 | Li | ................. H04N 21/8358 707/702 |

(Continued)

OTHER PUBLICATIONS

Internet of things, https://en.wikipedia.org/wiki/Internet_of_things?oldid=741724583, Creative Commons Attribution-Share Alike 3.0, 21 pp.

(Continued)

*Primary Examiner* — Arvin Eskandarnia
(74) *Attorney, Agent, or Firm* — Kelly J. Smith; Endress+Hauser (USA) Holding Inc.

(57) ABSTRACT

The present disclosure relates to a method for tamper-proof storage of data of a field device operated by means of automation technology, wherein the field device comprises a sensor and/or actuator and an electronic unit, the field device generating data. The method comprises steps of creating at least one transaction containing generated data of the field device and storing the transaction in a data block of Blockchain technology comprising a data field containing stored transactions and a hash value. The method also includes steps of linking the data block to previously created data blocks, storing the data block in a service platform and creating and storing a security data block in the service platform.

9 Claims, 2 Drawing Sheets

(51) Int. Cl.
  *H04L 9/30*   (2006.01)
  *H04L 29/08*  (2006.01)
  *H04L 29/06*  (2006.01)

(52) U.S. Cl.
  CPC .............. *H04L 67/10* (2013.01); *H04L 67/42* (2013.01); *H04L 2209/38* (2013.01)

(56) References Cited

U.S. PATENT DOCUMENTS

| | | |
|---|---|---|
| 2014/0269329 A1* | 9/2014 | Hooda .................... H04L 49/70 370/238 |
| 2016/0212146 A1 | 7/2016 | Wilson |
| 2016/0283920 A1 | 9/2016 | Fisher et al. |

OTHER PUBLICATIONS

Bitcoin, https://de.wikipedia.org/wiki/Bitcoin?oldid=158290345, Creative Commons Attribution-Share Alike 3.0, 31 pp.

Christidis, Konstantinos and Devetsikiotis, Michael, Blockchains and Smart Contracts for the Internet of Things, IEEE Access, Special Section on the Plethora of Research in Internet of Things (IoT), vol. 4, 2016 (current version Jun. 3, 2016), 12 pp. (2292-2303).

Challal, Yacine, Bettahar, Hatem, and Bouabdallah, Abdelmadjid, A Taxonomy of Multicast Data Origin Authentication: Issues and Solutions, IEEE Communications Surveys & Tutorials, Third Quarter 2004, vol. 6, No. 3, 24 pp. (34-57).

Zhou, Yun and Fang, Yuguang, Multimedia Broadcast Authentication Based on Batch Signature, IEEE Communications Magazine, Aug. 2007, 6 pp. (72-77).

\* cited by examiner

METHOD FOR TAMPER-PROOF STORAGE OF DATA OF A FIELD DEVICE

CROSS-REFERENCE TO RELATED APPLICATIONS

The present application is related to and claims the priority benefit of German Patent Application No. 10 2016 118 614.7, filed on Sep. 30, 2016 and International Patent Application No. PCT/EP2017/071543, filed on Aug. 28, 2017, the entire contents of which are incorporated herein by reference.

TECHNICAL FIELD

The invention relates to a method for tamper-proof storage of data of a field device of automation technology.

BACKGROUND

Field devices that are used in industrial plants are already known from the prior art. Field devices are often used in process automation, as well as in manufacturing automation. Field devices, in general, refer to all devices which are process-oriented and which supply or process process-relevant information. Field devices are thus used for detecting and/or influencing process variables. Measuring devices, or sensors, are used for detecting process variables. These are used, for example, for pressure and temperature measurement, conductivity measurement, flow measurement, pH measurement, fill-level measurement, etc., and detect the corresponding process variables of pressure, temperature, conductivity, pH value, fill-level, flow, etc. Actuators are used for influencing process variables. These are, for example, pumps or valves that can influence the flow of a fluid in a pipe or the fill-level in a tank. In addition to the aforementioned measuring devices and actuators, field devices are also understood to include remote I/O's, radio adapters, or, generally, devices that are arranged at the field level.

A variety of such field devices is produced and marketed by the Endress+Hauser group.

In modern industrial plants, field devices are usually connected via communications networks, such as fieldbuses (Profibus®, Foundation® Fieldbus, HART®, etc.), to higher-level units. Usually, the superordinate units are control units such as an SPC (storage programmable control) or a PLC (programmable logic controller). The higher-level units are used for, among other things, process control, as well as for commissioning of the field devices. The measured values detected by the field devices—in particular, by sensors—are transmitted via the respective bus system to one (or possibly several) higher-level unit(s) that further process the measured values, as appropriate, and relay them to the control station of the plant. The control station serves for process visualization, process monitoring, and process control via the superordinate units. In addition, a data transfer is also required from the higher-level unit via the bus system to the field devices—in particular, for configuration and parameterization of field devices, as well as for control of actuators.

Field devices create and/or process a variety of different data. In addition to measurement data already mentioned above from sensors, through which a plant operator receives information about the current process values of measuring points of his plant, these data are, for example, control data, such as for positioning an actuator. Furthermore, the data are diagnostic, historical, and/or status data by means of which the plant operator is informed about problems of the field devices or the current status of the individual field devices, or calibration/parameter data.

Nowadays, it is customary to save this data at a central location in the plant—for example, in a database in a workstation PC on the control level of the plant. However, this is associated with disadvantages; if the database fails or if the database is destroyed or unreadable, then the data saved on this database are lost.

Furthermore, the data can be manipulated, since they are frequently sent unencrypted over the communications network, or are saved unencrypted on the database. If data are subsequently manipulated, this is very difficult to track or is only noticed much later due to the volume of saved data.

SUMMARY

Given this problem, the invention is based upon the aim of providing a method which allows data of a variety of field devices in a process automation plant to be saved in a (tamper) safe manner.

The aim is achieved by a method for tamper-proof storage of data of a field device of automation technology, wherein the field device has a sensor and/or actuator and an electronics unit, wherein the field device generates data which are, in particular, measurement data, control data, historical data, parameterization data, and diagnostic and/or status data, comprising:

creation of at least one transaction, wherein the transaction contains generated field device data;

storage of the transaction in a data block, wherein the data block is designed in accordance with a data block of blockchain technology and therefore has a data field containing saved transactions and a hash value;

linkage of the data block to previously-created data blocks by calculating the hash value of the data block from the data contained in the transaction and by calculating the hash value of a previous data block; and storage of the data block in a service platform, wherein the previously-created data blocks are saved in the service platform;

creation and storage of a security data block in the service platform, wherein transactions of the hash value of the previous data block are additionally or alternatively contained in the data field of the security data block, wherein the hash value of the previous data block is signed with a first private key.

The major advantage of the method according to the invention is that data are saved in the form of tamper-proof data blocks. The data field of a data block contains all the transactions generated after the time of creation of the last data block. These transactions are converted by an algorithm into an intermediate value; for example, the "Merkle root" of all transactions contained in the data field of the data block is calculated. The hash value of the data block is generated from this intermediate value and the hash value of the preceding data block. A series of many data blocks is referred to as a blockchain. By calculating the data saved in a data block to form a hash value, these data cannot be changed/manipulated without changing the hash value of the data block, and thus the respective hash values of all subsequent data blocks.

Even if an attacker should succeed in manipulating data of a data block, as well as in changing the hash values of the subsequent data blocks in conformity with the manipulated data block, a manipulation can be easily detected. Namely, the security data block contains in its data field the hash value of the previous data block signed by means of a first private key. The first private key is known only to the owner of the field device and/or the operator of the service platform. An attacker therefore cannot manipulate this saved hash value without knowledge of the first private key. In case, as described above, hash values of the data blocks are processed to obtain the conformity of the blockchain, the signed hash value of the data block preceding the security data block and saved in the data field of the security data block is not changed. By matching the hash value of the preceding data block with the signed hash value, a manipulation can be detected, since the hash value of the preceding data block in the event of a manipulation differs from the hash value saved in the data field of the security data block.

The field device is preferably directly connected to the Internet, or indirectly, e.g., by means of a fieldbus of automation technology, which is in communication with an Internet-capable device—preferably, a gateway or an edge device. Via the Internet, the field device contacts the service platform and sends this its generated data. The service platform itself creates and saves the transactions, as well as the data blocks containing the transactions.

Field devices that are mentioned in connection with the method according to the invention are already described by way of example in the introductory part of the description.

A preferred embodiment of the method according to the invention provides that the service platform comprise at least one database in which the data blocks, or the security data blocks, are centrally saved by a client/server architecture. As already noted above, the field device serves merely as an originator of the data and transmits these data to the service platform, in which the transactions and the data blocks, or the security data blocks, can be created. The field device therefore does not have to be upgraded to carry out the method according to the invention, as a result of which no additional time and costs are incurred.

According to an advantageous further development of the system according to the invention, the service platform is operated decentrally with the aid of blockchain technology and consists of a variety of participant nodes, wherein the participant nodes create data blocks, or security data blocks, wherein, in each case, at least one database is integrated in each participant node, and wherein the data blocks, or the security data blocks, are saved decentrally in the databases. A participant node is formed by a computing unit. The various participant nodes are connected to each other via a network—for example, via the Internet. The field device contacts one of the participant nodes of the service platform and transmits to it the data to be saved. If applicable, the participant node transmits this data to all other participant nodes for validation and then creates a new data block, or a security data block, which contains the transaction and, possibly, further transactions.

In this case, it is provided that the same data blocks, or security data blocks, i.e., the identical data, be saved and available on all databases at all times. If one or more databases fail or are manipulated by an attacker, the information can be read out from the remaining databases, as a result of which complete data loss is virtually impossible. An example of such a service platform is, for example, Etherium.

An advantageous embodiment of the method according to the invention provides that a created data block or security data block be verified by all participant nodes and only then be saved in the service platform if at least a predetermined number of all participant nodes successfully verifies the hash value of the data block. The data block or the security data block is validated in such a way that its hash value is checked. Only if the valid hash value of the previous data block is used can the data block or the security data block be successfully validated. As a result, data cannot be changed in a successfully-validated data block without accordingly changing the subsequent data blocks. A change in data produces a changed intermediate value, thereby also changing the hash value of the respective data block. The subsequent data block thus no longer matches its previous data block. Data of a once successfully-validated data block can therefore no longer be changed by an attacker.

A particularly advantageous embodiment of the method according to the invention provides that the created transaction be transmitted to all participant nodes before being saved in the data block or the security data block and be validated by the participant nodes, and wherein the created transaction only then be saved in the data block or in the security data block if it is successfully validated by at least one of the participant nodes. An additional safety step is thereby achieved. It is, in particular, checked whether the originator of the transaction is a valid participant node, or that the data contained in the transaction, for example, lie within a valid value range.

A preferred development of the method according to the invention provides that the field device itself form a participant node of the service platform and create transactions and/or data blocks or security data blocks. For this, the field device may, however, require sufficient power and energy, possibly supplied by means of an additional energy supply, since, for creating a data block, complex algorithms are executed. In contrast to the creation of a data block, the creation of a transaction requires significantly less power, so that the field device does not have to possess an additional power supply and can also be supplied with energy by the communications network.

In this case, it can be provided that the algorithms required for creating the transactions and/or the data blocks or the security data blocks be integrated in the electronics unit of the field device, or that the field device have a modular additional electronics unit, especially, a plug-in module, in which these algorithms are implemented. The algorithms/software commands required for this can be loaded for this purpose, e.g., in the form of a firmware update, to a writable memory in the electronics unit or the additional electronics unit.

A particularly advantageous embodiment of the method according to the invention provides that the field device receive the hash value of the previous data block before the transaction is created, and sign and/or encrypt the generated data and/or the hash value of the previous data block with the first private key, or with a second key deviating from the first private key. This is an additional security mechanism, since, now, the individual data of the transactions, and consequently the data fields of the data blocks, are likewise signed or encrypted. Without knowledge of the first or the second key, an attacker cannot change the data of a data block. The second key may be a private key or a public key, which may also be asymmetrical.

According to a preferred development of the method according to the invention, it is provided that the security data block be created at defined time intervals. It is advantageous to select the time intervals according to the quantity and the rate of newly-created data blocks. In particular, when new data blocks are produced comparatively frequently, it is advantageous to select short time intervals.

A particularly preferred embodiment of the method according to the invention provides that the signed hash value be verified by means of a public key corresponding to the first private key. By means of the public key, the signature of the hash value can, in principle, be verified by anyone. However, manipulation of this hash value is not possible without knowledge of the first private key.

BRIEF DESCRIPTION OF THE DRAWINGS

The invention is explained in greater detail with reference to the following figures. Shown are.

DETAILED DESCRIPTION

Figure 1:
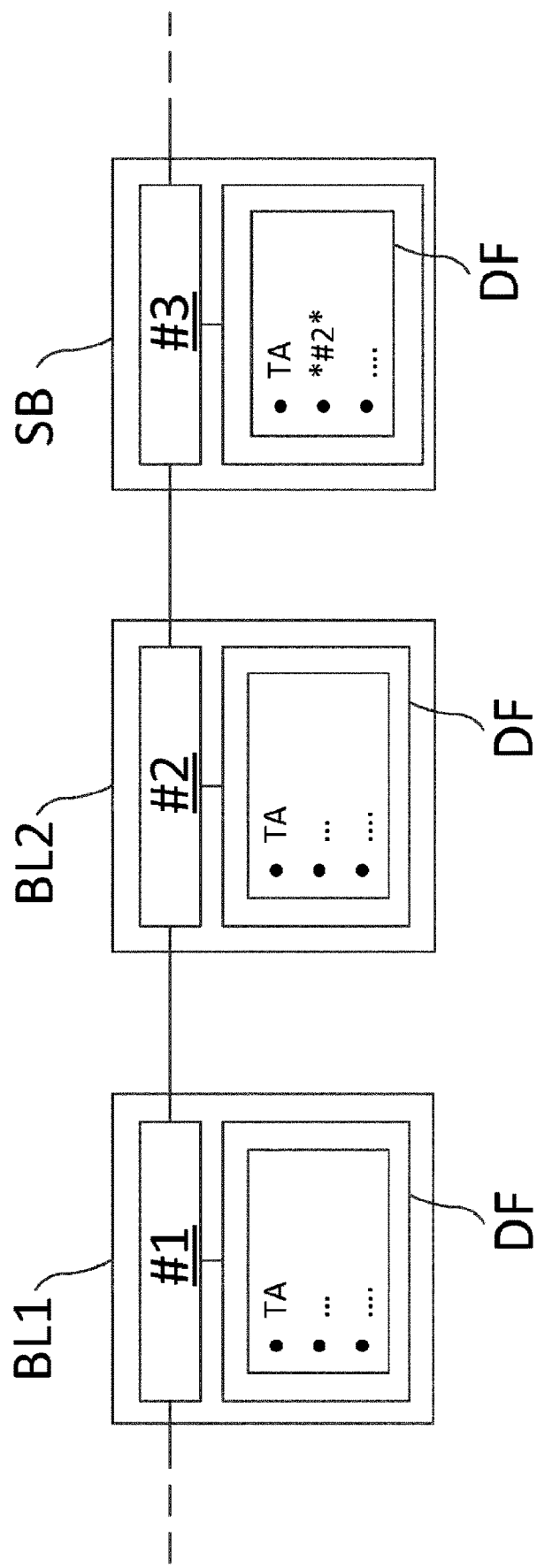
FIG. 1 shows an illustration of data blocks which are used in a method of the present disclosure.

FIG. 1 shows an illustration of data blocks BL1, BL2, SB which are configured in accordance with blockchain technology and are used in the method according to the invention. Blockchain technology became known as the basis of the Internet currency, Bitcoin. A blockchain, i.e., a chain of linked data blocks BL1, BL2, SB, allows high data integrity. The operation of a blockchain designed for the method according to the invention shall be briefly explained below.

As a rule, said data block BL1, BL2, SB consists of at least two components; for one, this is a data field DF. Data in the form of transactions TA are saved in this data field DF. Transaction TA denotes a transmission of the data from a first participant node TK to a second participant node TK in a communications network KN. A transaction TA contains a transmitted value—in this case, data—as well as the transmitter and the receiver of the transaction TA. The participant node TK refers to all devices which use the blockchain technology in the communications network KN.

A data field DF of a data block BL1, BL2, SB contains at least one transaction TA, and, more frequently, several transactions TA.

For another, a data block BL1, BL2, SB contains a checksum #1, #2, #3. Such a checksum #1 #2 #3 is a hash value and is created by sometimes complex calculations. For this purpose, all transactions TA of the data field of a block BL1, BL2, SB are calculated to form an intermediate value. To accomplish this, the Merkle root of the total number of transactions TA is calculated. The exact functional principle will not be discussed at this point. For this, reference is made, for example, to https://en.wikipedia.org/wiki/Merkle_tree.

This calculated intermediate value is then converted with the checksum #1, #2, #3 of the previous data block BL1, BL2, SB into checksum #1, #2, #3 of the current data block BL1, BL2, SB. For example, the data block BL2 shown in FIG. 1 contains a checksum #2. This checksum #2 has thus been calculated from the transactions TA saved in the data field DF of the data block BL2 and the checksum #1 of the preceding data block BL1. Analogously, the data block SB shown in FIG. 1—a security data block (more on this later)—contains a checksum #3. This checksum #3 has thus been calculated from the transactions TA saved in the data field DF of the data block SB and the checksum #2 of the preceding data block BL2.

The integrity of the data, i.e., the safety of the data from subsequent manipulations, is thus ensured by saving the checksum #1, #2 of the preceding data block BL1, BL2 in each subsequent data block BL2, SB. A blockchain thus consists of a series of data blocks BL1, BL2, SB, in each of which one or more transactions TA are combined and provided with the checksum #1, #2, #3. A change in data generates a changed intermediate value, thereby also changing the checksum #1, #2, #3 of the respective data block BL1, BL2, SB. The subsequent data block BL1, BL2, SB thus no longer matches the preceding data block BL1, BL2, SB. Data of a once successfully-validated data block BL1, BL2, SB can therefore no longer be changed by an attacker.

New data blocks BL1, BL2, SB are created at regular time intervals. All transactions TA which were created after the time when the last data block BL1, BL2, SB was created are saved in the data field of the new data block BL1, BL2, SB.

The complexity of block creation can be increased in that the created checksum #1, #2, #3 must have a predefined format. For example, it is established that the checksum must be 24 digits long, wherein the first four digits must have the numerical value 0. For this purpose, in addition to the intermediate value of the transactions TA and the checksum of the previous data block, a to-be-determined numerical sequence, designated a nonce, with a fixed length is used to calculate the checksum #1, #2, #3 of the current data block BL1, BL2, SB. The calculation of the new checksum #1, #2, #3 takes correspondingly longer, since only a few nonces are present which result in the calculation of a checksum #1, #2, #3 with the predetermined criteria. Finding such a suitable nonce in this case thus causes the additional time expenditure described.

After the checksum #1, #2, #3 of a new data block BL1, BL2, SB has been created, the data block is transmitted to all participant nodes TK. The participant nodes TK now check the checksum #1, #2, #3 of the new data block BL1, BL2, SB. Only after successful validation is the data block BL1, BL2, SB saved in all participant nodes TK. In particular, successful validation of more than half of all participant nodes TK is required for this purpose. An attacker would therefore have to manipulate or control a large number of participant nodes TK to introduce/create a foreign, harmful data block BL1, BL2, SB, in order to successfully validate the injected data block BL1, BL2, SB. With an increasing number of participant nodes TK, this is to be considered as good as impossible.

Much less effort is required to validate a data block BL1, BL2, SB than to create the data block BL1, BL2, SB. The checksum #1, #2, #3 is back-calculated, and the intermediate value of the transactions TA, or the checksum #1, #2, #3 of the previous data block BL1, BL2, SB, is recovered and compared with the actual intermediate value or with the actual checksum #1, #2, #3 of the previous data block BL1, BL2, SB. If these values match, the data block BL1, BL2, SB is successfully validated.

A further security level is implemented in the method according to the invention; in the embodiment shown in FIG. 1, two normal data blocks BL1, BL2 and a so-called security data block SB are shown. In addition to the transactions TA, the hash value *#2* of the preceding data block BL2 is saved in the data field DF of this security data block SB and signed with a private key. Even if an attacker should succeed in manipulating data of one of the data blocks BL1, BL2 preceding the security data block SB, as well as in changing the hash values #1, #2, #3 of the subsequent data blocks BL1, BL2, SB to conform to the manipulated data block BL1, BL2, a manipulation can be easily detected. The first private key is known only to the person executing the signature process. An attacker cannot therefore manipulate this hash value *#2* saved in the security data block SB without knowledge of the first private key. In the event that hash values #1, #2, #3 of the data blocks BL1, BL2 SB are processed to obtain the conformity of the blockchain, the signed hash value *#2* of the data block BL2 preceding the security data block SB and saved in the data field DF of the security data block SB is not changed. By matching the hash value #2 of the preceding data block BL2 with the signed hash value *#2*, a manipulation can be detected, since the hash value #2 of the preceding data block BL2 differs in case of manipulation from the hash value *#2* saved in the data field DF of the security data block SB, or the signature is invalid.

The time at which such a security data block is created may be defined, and should be adapted to the amount and rate of newly-created data blocks BL1, BL2.

Figure 2:
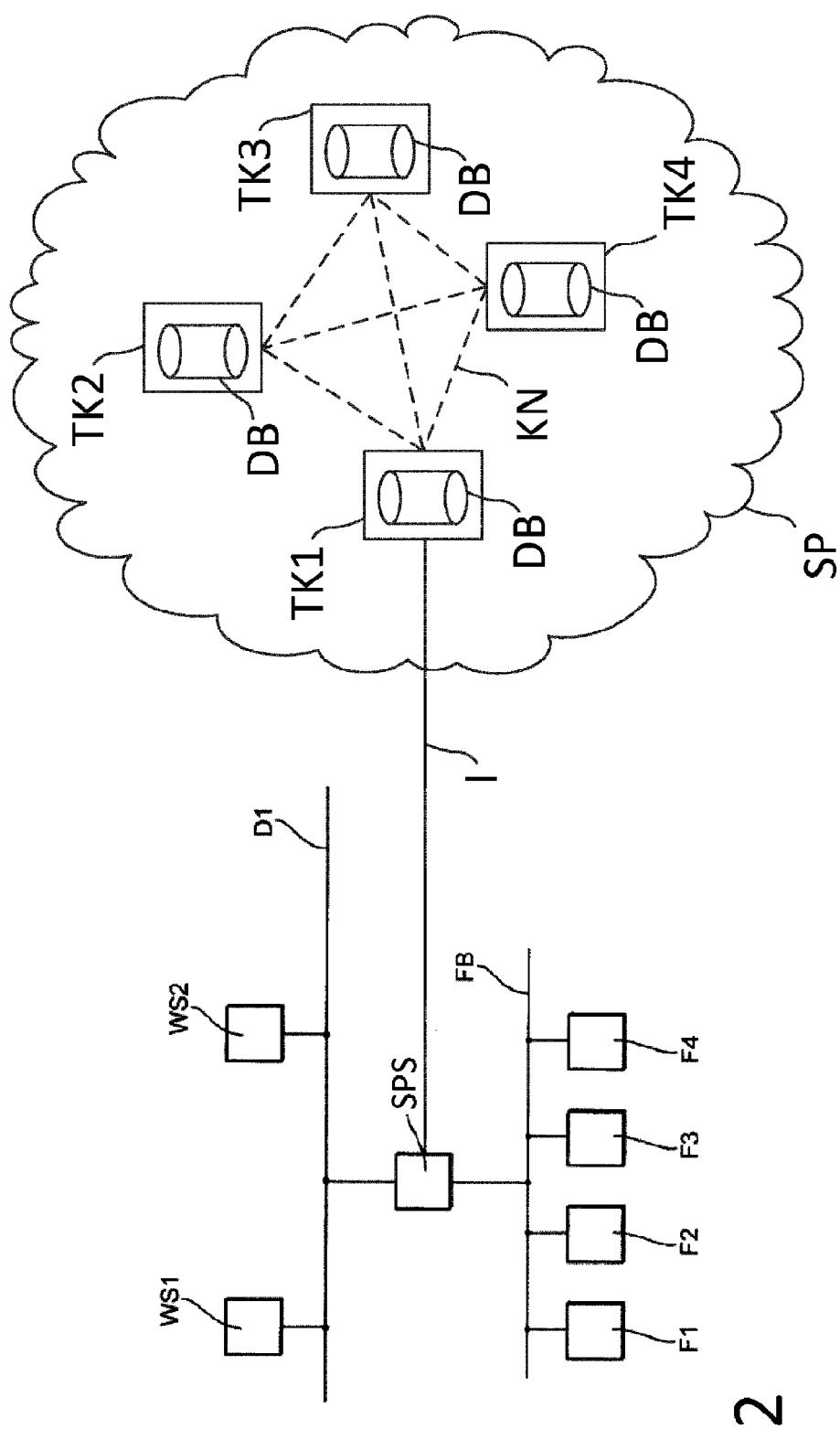
FIG. 2 shows an exemplary embodiment of a method according to the present disclosure.

FIG. 2 shows an embodiment of the method according to the invention. A system of automation technology is shown here. On a data bus D1, which is, for example, a fieldbus on the control level such as the Ethernet, several computer units WS1, WS2 in the form of work station PC's are connected on the control level of the plant. These computer units serve as higher-level units (control system or control unit), inter alia, for process visualization, process monitoring, and for engineering, such as for operating and monitoring field devices F1, F2, F3, F4. Via a control unit SPC that, for example, is designed as a storage programmable control and is basically also termed the higher-level unit, the control level of the plant is connected to several field devices F1, F2, F3, F4. The field devices F1, F2, F3, F4 can be either sensors or actuators. The fieldbus FB works according to one of the known fieldbus standards, e.g., Profibus, Foundation Fieldbus®, or Hart®. Instead of the fieldbus FB, it can also be a local area network or a wide area network—for example, the Internet.

The control unit SPC possesses an interface by means of which the control unit SPC is connected to another network I—in this exemplary embodiment, the Internet. Via the Internet I, the control unit SPC is connected to a service platform SP. The service platform SP comprises several participant nodes TK1, TK2, TK3, TK4. The participant nodes TK1, TK2, TK3, TK4 are interconnected by means of a communications network KN, are designed to realize a blockchain with the properties and functions described in FIG. 1, and have each a database DB.

Via the control unit SPC, the field devices F1, F2, F3, F4 transmit their generated data to the service platform SP via the Internet. A definition of field devices F1, F2, F3, F4 and the possible generated data is already described in the introductory part of the description. Alternatively, the data of the field devices F1, F2, F3, F4 can also be transmitted to the service platform SP via another device connected to the fieldbus FB and to the Internet I—for example, a gateway or an edge device. It can also be provided for the field devices F1, F2, F3, F4 to each have their own interface, via which the field devices F1, F2, F3, F4 can be connected to the Internet I.

Upon receipt of the data from the field devices F1, F2, F3, F4, a participant node TK1, TK2, TK3, TK4 of the service platform creates one or more transactions TA containing the data. After validation of the transactions TA by all participant nodes TK1, TK2, TK3, TK4, a block is created, as described in FIG. 1, or a security data block SP is created, and, possibly, the further steps described in FIG. 1 may be performed.

In conclusion, a number of advantages of the method according to the invention are again listed:

Decentralized storage of the data of the plant in several databases DB instead of in a central database DB, thereby reducing the vulnerability of the data;

Integrity of the data by linking the data blocks BL1, BL2, BL3;

Running through several validation procedures, whereby only the transactions TA satisfying the requirements or validated blocks BL1, BL2, BL3 are saved;

Additional protection against attacks by creating a security data block SB at predetermined times which contains the signed hash value *#2* of the preceding data block BL2.

It goes without saying that the portrayed exemplary embodiments are only exemplary in nature, and that the method according to the invention can be carried out with any type and arrangement of field devices in a process automation plant.

LIST OF REFERENCE SYMBOLS

BL1, BL2 Data block
D1 Data bus
DB Database
DF Data field
F1, F2, F3, F4 Field device
FB Fieldbus
KN Communications network
SB Security data block
SPC Control unit
SP Service platform
TA Transaction
TK1, TK2, TK3, TK4 Participant nodes
WS1, WS2 Workstation PC
1, #2, #3 Hash values of the data blocks
*#2* Signed hash value

The invention claimed is:

1. A method for tamper-resistant storage of data of a field device of automation technology,
wherein the field device has a sensor and/or actuator and an electronics unit, comprising:
creating at least one transaction containing generated data of the field device;
storing the transaction in a blockchain technology data block having a data field containing saved transactions and a hash value;
linking the data block to previously-created data blocks by calculating the hash value of the data block from the data contained in the transaction and by calculating the hash value of a previous data block;
storing the data block in a service platform, wherein the previously-created data blocks are saved in the service platform; and
creating and storing a security data block in the service platform, wherein transactions of the hash value of the previous data block are additionally or alternatively contained in the data field of the security data block, wherein the hash value of the previous data block is signed with a first private key.

2. The method of claim 1, wherein the service platform includes at least one database in which the data blocks or the security data blocks are saved centrally via a client/server architecture.

3. The method of claim 1, wherein the service platform is operated decentrally with the aid of a blockchain technology and consists of a plurality of participant nodes, wherein the participant nodes create data blocks or security data blocks, wherein at least one database is integrated in each participant node, and wherein the data blocks or the security data blocks are saved decentrally in the databases.

4. The method of claim 3, wherein the field device forms a participant node of the service platform and creates transactions and/or data blocks or security data blocks.

5. The method of claim 3, wherein a created data block or security data block is verified by all participant nodes and is only saved in the service platform when at least a predetermined number of all participant nodes successfully verify the hash value of the data block or of the security data block.

6. The method of claim 5, wherein the created transaction is transmitted to all participant nodes before being saved in the data block or in the security data block and is validated by the participant nodes, and wherein the created transaction is only saved in the data block or in the security data block if it is successfully validated by at least one of the participant nodes.

7. The method of claim 1, wherein, before the transaction is created, the field device receives the hash value of the previous data block and signs and/or encrypts the generated data and/or the hash value of the previous data block with the first private key, or with a second key deviating from the first private key.

8. The method of claim 1, wherein the security data block is created at defined time intervals.

9. The method of claim 1, wherein the signed hash value is verified by means of a public key corresponding to the first private key.

* * * * *